United States Patent
Goodman et al.

(10) Patent No.: US 6,970,318 B2
(45) Date of Patent: Nov. 29, 2005

(54) ELECTRONICALLY UPDATABLE LABELING SYSTEM FOR DATA STORAGE

(75) Inventors: Brian Gerard Goodman, Tucson, AZ (US); Michael Philip McIntosh, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 10/649,095

(22) Filed: Aug. 26, 2003

(65) Prior Publication Data

US 2005/0046989 A1    Mar. 3, 2005

(51) Int. Cl.$^7$ .................. G11B 19/02; G11B 23/02
(52) U.S. Cl. ........................... 360/69; 360/132
(58) Field of Search ................. 360/31, 69, 133, 360/132, 137, 75; 369/77.2, 75; 340/815.4; 235/492, 493, 487; 345/50

(56) References Cited

U.S. PATENT DOCUMENTS

| | | | |
|---|---|---|---|
| 4,889,982 A | 12/1989 | Young et al. ................ 235/494 |
| 5,303,214 A | 4/1994 | Kulakowski et al. ......... 369/34 |
| 5,323,327 A | 6/1994 | Carmichael et al. ........ 364/478 |
| 5,484,055 A | 1/1996 | Felde et al. ............. 206/387.1 |
| 5,729,464 A | 3/1998 | Dimitri .................. 364/478.03 |
| 5,745,102 A * | 4/1998 | Bloch et al. ................ 345/530 |
| 5,949,059 A | 9/1999 | Rawson, Sr. et al. ....... 235/487 |
| 5,986,992 A * | 11/1999 | Bardmesser ................ 720/652 |
| 6,039,260 A * | 3/2000 | Eisele ........................ 235/492 |
| 6,088,182 A | 7/2000 | Taki et al. ..................... 360/71 |
| 6,205,093 B1 | 3/2001 | Abbott et al. ................. 369/34 |
| 6,226,688 B1 | 5/2001 | Frary ......................... 709/310 |
| 6,476,725 B2 * | 11/2002 | Aguren et al. ........... 340/815.4 |
| 2003/0067702 A1 * | 4/2003 | Iles et al. ..................... 360/69 |

FOREIGN PATENT DOCUMENTS

| EP | 1197905 A2 | 4/2002 | .......... G06F 17/60 |
|---|---|---|---|
| KR | 002053652 A | 7/2002 | ............ G06K 7/10 |

OTHER PUBLICATIONS

"Application of barcode technology in automated storage and retrieval systems", pp 641-646, Proceedings of the 1996 IEEE IECON.

* cited by examiner

*Primary Examiner*—Andrew L. Sniezek
(74) *Attorney, Agent, or Firm*—John H. Holcombe (57) ABSTRACT

An electronically updatable external labeling system for a data storage element, such as a data storage cartridge for magnetic tape media. An electronic persistent visual display is at a cartridge external surface. An electronic persistent visual display has a stable image "memory effect" for an extended period of time. An input is provided for a signal for updating the visual display; and an update agent, such as a power source, is provided for operating the visual display in response to the input signal, such that the visual display comprises an updated persistent visual display label. Further, a nonvolatile electronic memory may be provided, such that both the visual display and the memory are electronically updatable.

6 Claims, 8 Drawing Sheets

ELECTRONICALLY UPDATABLE LABELING SYSTEM FOR DATA STORAGE

FIELD OF THE INVENTION

This invention relates to data storage devices and systems, and, more particularly, to labeling employed with respect to such devices and systems.

BACKGROUND OF THE INVENTION

Labeling is employed in several aspects of data storage devices and systems. In one example, labels are provided on data storage cartridges, such as magnetic tape cartridges, to identify the cartridges. The labels may comprise alphanumeric characters which are human readable, and which may also be machine readable, and/or may comprise machine readable bar code labels. The human readable labels allow a user to identify and select a cartridge for loading into an automated data storage library. When cartridges are stored in storage shelves of an automated data storage library, a robot accessor of the library may comprise a machine reader to read the bar code of a cartridge at a desired storage shelf to determine what the cartridge is, or, if known, to insure that the desired cartridge is actually in the desired storage shelf and is selected. For example, a robot accessor bar code reader may scan the labels of all or a portion of the data storage cartridges in the library and pass the information to a host computer to form an inventory of the library contents. A human readable label allows an operator to identify cartridges to transport into or out of the library, for example, at an input/output station.

An automated data storage library may also have labels which identify the library itself, which identify a component of the library, and which provide information about the library, such as calibration or alignment information, or to identify a logical organization of the library, for example, to identify partitions of the library, each of which may comprise a logical library.

These labels are preprinted and are positioned on the data storage cartridge, or positioned at the desired points of the automated data storage library, and are typically either permanent or snapped into position. The mounting of a label on a cartridge is typically done manually, either by the media manufacturer, media supplier, library manufacturer or by the end user. Since the labels are preprinted, the information may be limited in scope, for example, providing a cartridge number, but not relating to the data content of the cartridge. Further, customers may have specialized labeling requirements, and extra time and cost may be required to have special labels printed, shipped and affixed. A cartridge memory may therefore be provided, such as discussed in U.S. Pat. No. 5,786,955, to store information that pertains to the data stored on the data storage media of the cartridge. However, the information is not visible, and requires that the cartridge be accessed and provided to a cartridge memory reader for reading the information. Further, such information is not human readable, requiring an operator to have the cartridge memory read to determine the needed information, or to have a separate listing based on the human readable information, such as a cartridge number.

Labels may be updated by applying a new label to a cartridge, for example, by physically applying it over the top of a prior label. A cartridge memory reader may also comprise a cartridge memory writer and update the cartridge memory. This is an entirely different process than physically applying a label, which typically requires removal of the data storage cartridge from the library. Hence, synchronization of the cartridge memory and the label may become difficult.

In an automated data storage library, changes in partitions would require either different labeling, or require algorithms to track the changes as based on the prior labeling.

SUMMARY OF THE INVENTION

An electronically updatable external labeling system is provided for a data storage element, such as a data storage cartridge, for example, comprising a magnetic tape media. An electronic persistent visual display is supported by an external surface of the data storage element. There are two types of electronic persistent visual displays, one having a stable image "memory effect" for an extended period of time in the absence of power, and the other is powered by a power source. An input is available for providing a signal for updating the visual display of the electronic persistent visual display; and an update agent is provided for updating the visual display of the electronic persistent visual display in accordance with the signal of the input, such that the visual display comprises an updated persistent visual display label. In one embodiment, the update agent comprises a power source for operating the electronic persistent visual display to update the visual display. In the second type of electronic persistent visual display, the power source may additionally maintain the display.

In a further embodiment, a nonvolatile electronic memory is provided at the data storage element or cartridge, for storing information related to the visual display of the electronic persistent visual display. An output interface of the data storage element or cartridge allows the nonvolatile electronic memory to be read externally of the data storage element or cartridge, and the same or a second input is available for providing a signal for altering the information of the nonvolatile electronic memory, updating the information, such that the electronic persistent visual display and the information of the nonvolatile electronic memory both are electronically updatable. Thus, either or both may be updated to become or remain consistent.

In another embodiment a refresh control senses the nonvolatile electronic memory, and provides a refresh signal related to the sensed nonvolatile electronic memory, for refreshing the visual display of the electronic persistent visual display; and operates the update agent for updating the visual display of the electronic persistent visual display in accordance with the refresh signal of the refresh control.

In one embodiment, the visual display of the electronic persistent visual display comprises a human readable visual display. In another embodiment, the visual display of the electronic persistent visual display comprises a machine readable visual display. An example of a machine readable visual display comprises a bar code.

In a further embodiment, the visual display of the electronic persistent visual display comprises a combined human readable visual display and a machine readable visual display. In a still further embodiment, a security control selectively provides a security signal; and operates the update agent to convert the human readable visual display and/or the machine readable visual display, if present, of the electronic persistent visual display to a blank in response to the security signal.

In another embodiment, an automated data storage library has storage shelves for storing data storage cartridges; update station(s) for interfacing with the data storage cartridges; and at least one robot accessor for transporting data storage cartridges between the storage shelves and at least one data storage drive, the data storage drive(s) for reading and/or writing data with respect to the data storage cartridges. The library has a processor for operating the robot accessor to access at least one of the data storage cartridges from storage shelves and/or data storage drive and to interface an accessed data storage cartridge(s) with the update station(s); and for operating the update station(s) to provide an update signal for updating an electronic persistent visual display of the accessed data storage cartridge(s). The update station(s) may be provided at the robot accessor, and/or data storage drive, and/or as a separate station.

In still another embodiment, an automated data storage library, has an electronic persistent visual display positioned at the library, for providing a visual display; an input for providing a signal for updating the visual display of the electronic persistent visual display; and an update agent for updating the visual display of the electronic persistent visual display in accordance with the signal of the input, such that the visual display comprises an updated persistent visual display. The electronic persistent visual display, in one embodiment, is positioned at the library so as to be visible externally of the library, and the visual display comprises a human readable visual display. In a further embodiment, the electronic persistent visual display is positioned in the vicinity of a component of the automated data storage library, comprising at least one of a plurality of storage shelves, at least one data storage drive and/or at least one robot accessor; where the visual display of the electronic persistent visual display comprises a machine readable visual display; and the library additionally comprises a machine visual display reader mounted at the robot accessor(s) for reading the machine readable visual display of the electronic persistent visual display, and an update station provided at the robot accessor(s) for interfacing with respect to the input.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
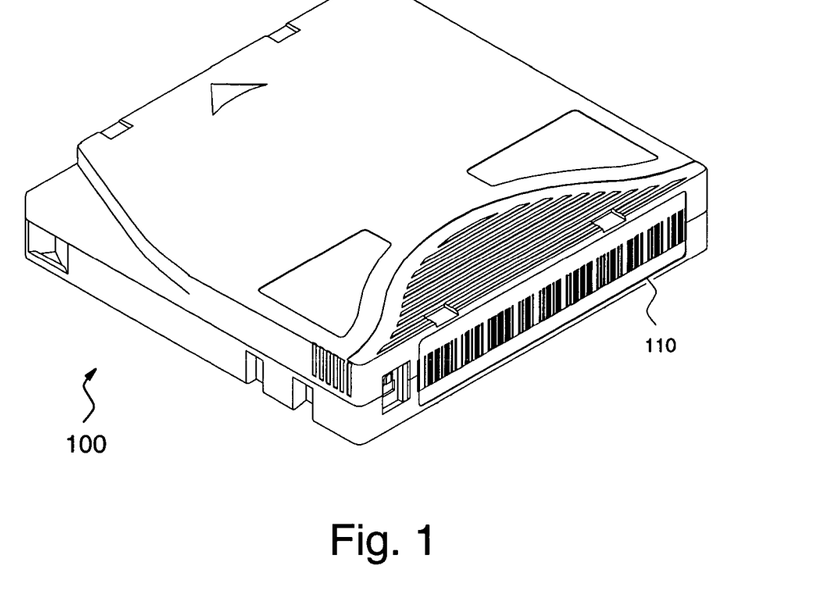
FIG. 1 is an isometric illustration of an embodiment of a data storage cartridge having an electronically updatable external labeling system with an electronic persistent visual display in accordance with the present invention.
Figure 2:
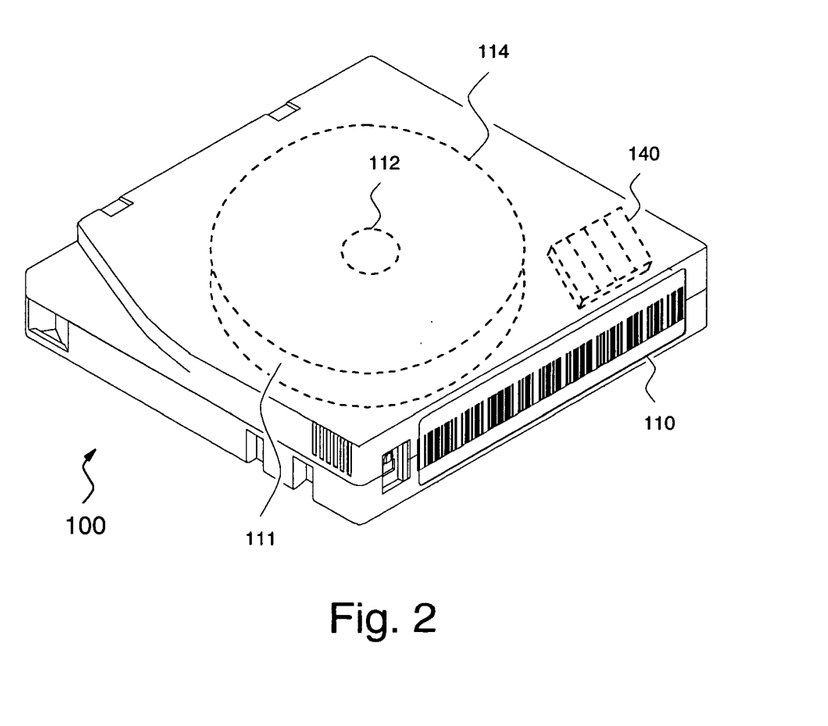
FIG. 2 is an alternate isometric illustration of the data storage cartridge of FIG. 1, illustrating a nonvolatile electronic memory and other components of the cartridge in phantom.

FIGS. 1 and 2 illustrate a data storage element 100, such as a data storage cartridge, having an electronic persistent visual display 110 supported by an external surface of the data storage element. The exemplary data storage cartridge comprises a data storage media 111, such as a length of magnetic tape, wound on a hub 112 of a reel 114. Data storage elements may additionally comprise optical data storage cartridges or cassettes having one or more optical disks, encased hard disk drives, or cartridges containing hard disk drives, or other elements such as electronic memory devices, as are known to those of skill in the art.

An electronic persistent visual display 110 has a stable image "memory effect" for an extended period of time. An example of a first type of electronic persistent visual display which has a persistent display in the absence of power is an "E Ink" electronic display which is available from E Ink Corporation, 733 Concord Ave., Cambridge, Mass. 02138. Alternatively, a second type that requires power for persistent display, may be used. Examples of displays comprise LCD (liquid crystal display), LED (light emitting diode) display, or equivalent, as understood by those of skill in the art. Examples of power sources for persistent displays comprise a battery or a capacitor, etc., charged via electrical connection, induction, light, RF energy, etc., as is understood by those of skill in the art.

Figure 3A:
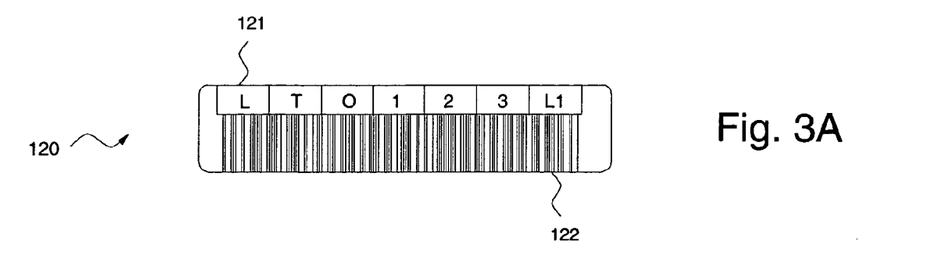
FIGS. 3A, 3B, 3C and 3D are front views of different examples of visual displays of electronic persistent visual displays employed in accordance with the present invention.
Figure 3B:
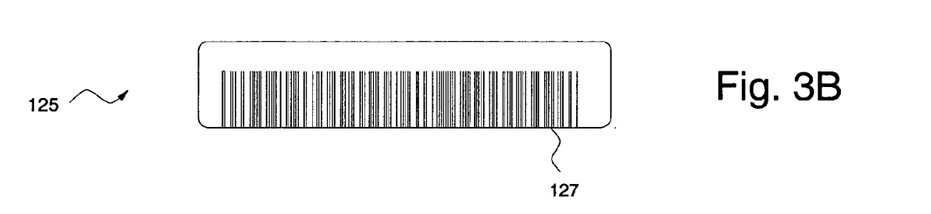
Figure 3C:
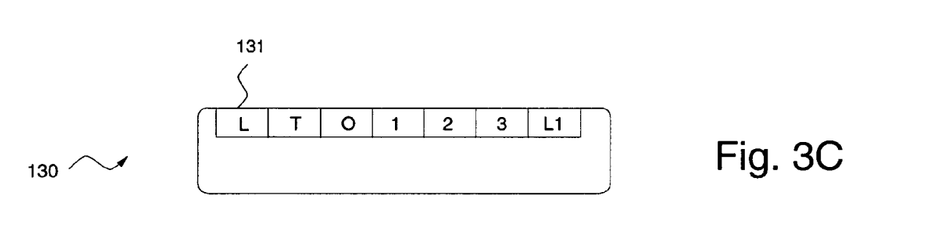
Figure 3D:
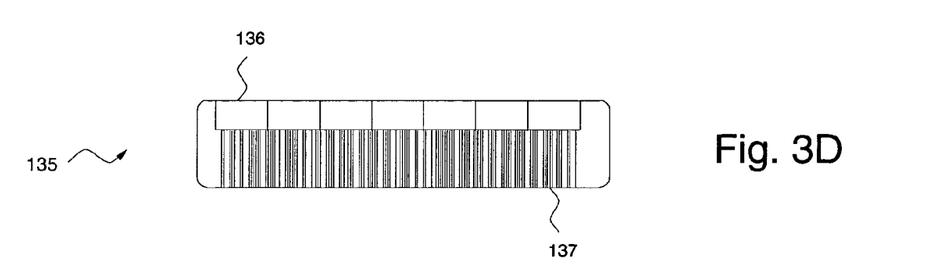

In accordance with the present invention, the electronically updatable external labeling system may provide various types of visual displays, such as illustrated in FIGS. 3A, 3B, 3C and 3D. In FIG. 3A, the visual display 120 comprises a human readable display 121 and a machine readable display 122, for example, readable by a bar code reader. In FIG. 3B, the visual display 125 comprises a machine readable display 127. In FIG. 3C, the visual display 130 comprises a human readable display 131. In FIG. 3D, the visual display 135 comprises a human readable display 136 and a machine readable display 137, and the human readable display has been set to all "blanks".

Referring to FIGS. 1, 2, 4 and 5, the electronically updatable external labeling system 138 of the present invention additionally comprises at least one electronic module 140 for operating the electronic persistent visual display 110. The electronic module comprises an input 142 for providing a signal for updating the visual display of the electronic persistent visual display; and an update agent 144 for updating the visual display of the electronic persistent visual display in accordance with the signal of the input, such that the visual display comprises an updated persistent visual display label. The input 142 receives signals from one or more sources external to the cartridge, and may comprise a transponder contactless optical, inductive, or RF interface, such as used for "smart cards", as is known to those of skill in the art, or may comprise an interface employing physical connections, also as is known to those of skill in the art.

Figure 5:
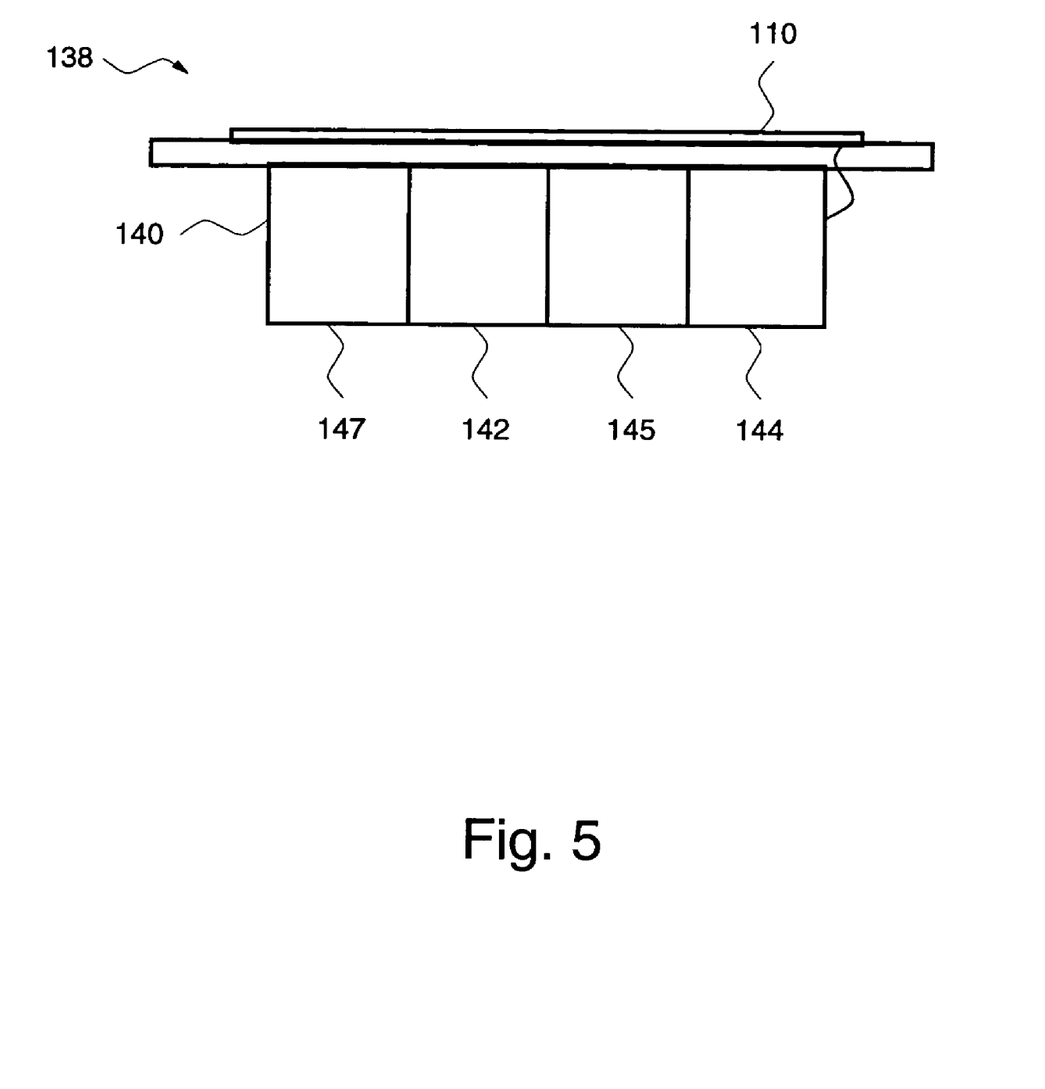
FIG. 5 is a block diagrammatic representation of an electronically updatable external labeling system with an electronic persistent visual display in accordance with the present invention.

The update agent 144 comprises an arrangement to operate the electronic persistent visual display to change or refresh its state. A first type of electronic display requires power to change state, and a second type of electronic display requires power both to change state and for persistent display, as previously discussed. Hence, the update agent 144, for the first type of display, may comprise a power source, or a conduit for external power, to operate the electronic persistent visual display to update or refresh the display to change state. For the second type of display, the update agent may comprise a conduit or a power source for changing the state of the visual display, while another power source maintains the persistent display. Alternatively, a power source of the update agent may also maintain the persistent display. The power source may comprise a battery, or a capacitor, etc., which is charged externally, for example, by electrical contact, by inductive coupling, by radiation collection, etc., as is known to those of skill in the art. The battery may or may not be charged. In one embodiment, the input interface 142 comprises both a power and information interface, such as a "smart card" interface, and such as is used in the IBM LTO "Ultrium" cartridge for an electronic memory. An optional control 145, in one embodiment, is provided for conducting additional operations with respect to the electronic persistent visual display 110.

In a further embodiment, an optional nonvolatile electronic memory 147 is provided at the data storage element or cartridge, for storing information related to the visual display of the electronic persistent visual display. An output interface of the nonvolatile electronic memory allows the nonvolatile electronic memory to be read externally of the data storage element or cartridge, and a memory input is available for providing a signal for altering the information of the nonvolatile electronic memory, updating the information, such that the electronic persistent visual display and the information of the nonvolatile electronic memory both are electronically updatable. The nonvolatile electronic memory 147 provides another form of machine readable information in addition to the electronic persistant visual display 110. Alternatively, the visual display of the electronic persistent visual display 110 may comprise the human readable information, and the nonvolatile electronic memory 147 may comprise the machine readable information, and is readable indirectly via the display.

In either implementation, both the human readable information and the machine readable information may be updated so as to be consistent. The same is true without the nonvolatile electronic memory, since the electronic persistent visual display 110 is a pseudo-storage device and may maintain both updated human readable information and machine readable information, and is readable indirectly via the display.

Thus, the present invention provides the ability for a host system, and/or an operator, and/or a library system to effectively change labels. Further, when changed, all of the related information may remain consistent.

The non-volatile electronic memory 147 may be provided at another electronic module, and in one embodiment, with its own input and output. Alternatively, in another embodiment, input 142 provides both the input for updating the visual display of the electronic persistent visual display, and for updating the information of the nonvolatile electronic memory 147 and provides the output for the nonvolatile electronic memory. The input 142 or electronic memory input/output may comprise a transponder contactless interface or may comprise an interface employing physical connectors, as discussed above.

The control 145 may comprise discrete logic, ASIC (application specific integrated circuit), FPGA (field programmable gate array), off-the-shelf microprocessor, custom processor, etc., with a RAM and/or nonvolatile memory for instructions, data, etc. The input 142, update agent 144, control 145 and nonvolatile electronic memory 147 may comprise one or more electronic circuits, chips, components or boards, as are known to those of skill in the art. The memory 147 may also be described as a "cartridge memory".

Figure 4:
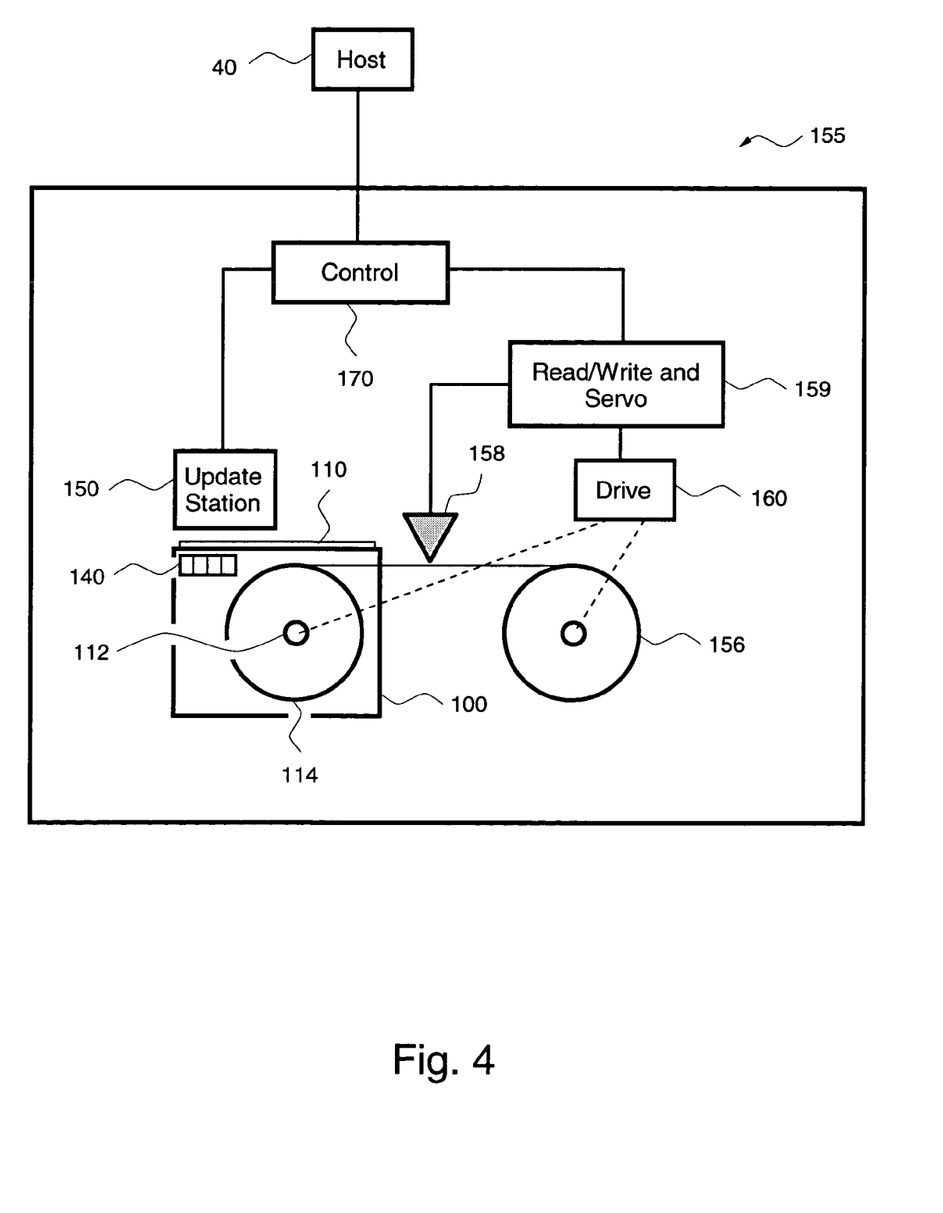
FIG. 4 is a block diagrammatic representation of a data storage drive and update station for updating an electronically updatable external labeling system of a data storage cartridge of FIG. 1, in accordance with the present invention.

An update station 150 of FIG. 4 is provided for interfacing with respect to the input 142 for updating the visual display of the electronic persistent visual display and/or interfacing with a power input and/or power source of update agent 144. In the example of FIG. 4, the update station 150 is associated with a data storage drive 155. The update station comprises an interface corresponding to the input 142, allowing communication therebetween. The update station may also comprise the corresponding charging unit to charge the power source of update agent 144. Further, the update station may also provide direct communication with a nonvolatile electronic memory 147.

Data storage cartridges storing magnetic tape media may comprise dual reel cartridges where the tape is moved between the two reels and a tape head reads and/or writes the tape at a position intermediate the two reels. The exemplary data storage cartridge 100 comprises a single reel cartridge in which the media 111 is wound on a reel 114 in the cartridge and, when loaded in the data storage drive 155, is fed between the cartridge reel and a take up reel 156. The exemplary data storage drive 155 comprises a read/write system having a tape read/write and servo head 158 with a servo system for moving the head laterally of the magnetic tape media 111, a read/write and servo control 159, and a drive motor system 160 which moves the magnetic tape media between the reels 114 and 156 and across the tape head 158 at a desired velocity, and stops, starts and reverses the direction of movement of the magnetic tape. An example of a data storage drive comprises an IBM LTO Ultrium Drive.

A control system 170 communicates with the update station 150, and communicates with the read/write system, e.g. at read/write and servo control 159.

Thus, with a data storage cartridge 100 loaded in the data storage drive 155, the host 40 or a library may have data written to the magnetic tape media 111 by the data storage drive, and/or either directly or by operating the control system 170, updates the visual display of the electronic persistent visual display 110, and/or may also alter the information of the nonvolatile electronic memory 147 of FIG. 5.

Referring to FIGS. 4 and 5, the update information is supplied by the update station 150 to the input 142 of the electronically updatable external labeling system. The input 142 provides a signal for updating the visual display of the electronic persistent visual display, and the update agent 144 operates the electronic persistent visual display 110 in accordance with the signal of the input to update the visual display, such that the visual display comprises an updated persistent visual display label.

The update station 150 additionally supplies the altering information to the nonvolatile electronic memory 147, optionally via input 142.

As an example, the updating and altering information may comprise an indication of the content of the data written to the magnetic tape media.

Once the cartridge or element 100 has been removed from the update station 150, the updated visual display persists, providing electronically updated external labeling of the cartridge or element.

In an embodiment of the present invention, control 145 comprises a refresh control, which senses the nonvolatile electronic memory 147, and provides a refresh signal related to the sensed nonvolatile electronic memory, for refreshing the visual display of the electronic persistent visual display; and the update agent 144 operates the electronic persistent visual display 110 in accordance with the refresh signal of the refresh control to update or refresh the visual display. The control 145 may employ a timer to initiate the refresh of the electronic persistent visual display 110, where the timer is related to the likely persistence timing of the electronic persistent visual display 110.

Referring additionally to FIGS. 3A and 3D, in a further embodiment of the present invention, control 145 comprises a security control which selectively provides a security signal; and operates the update agent 144 to convert the human readable visual display 120 of FIG. 3A of the electronic persistent visual display 110 from a human readable display, to a blank 136 of FIG. 3D in response to the security signal. Herein, "blank" refers to a value or state that does not show the actual value of the label. The security control allows machine readability only, e.g. of the machine readable display 137 of FIG. 3D, and prevents human readability of the label. This may be useful if the data written to the cartridge is financial or other sensitive information. In another variation, the entire label may be made blank so that only machine readable information would be available, and would only be available from the nonvolatile electronic memory 147, if any, or from the tape itself. Further, two labels may be provided, and the human readable visual display and/or the machine readable visual display set to a blank without a security control.

FIGS. 6, 7, 8 and 9 illustrate an embodiment of an automated data storage library which implements embodiments of the present invention. The library is arranged for accessing data storage cartridges, such as data storage cartridges 100 of FIGS. 1 and 2 in response to commands from at least one external host system. The library of FIGS. 6, 7, 8 and 9 comprises a "base frame" 11 having a plurality of storage shelves 16 on front wall 17 and rear wall 19 for storing the data storage cartridges. At least one data storage drive 15 is provided for reading and/or writing data with respect to the data storage cartridges, and at least one robot accessor 18 is provided for transporting the data storage cartridges between the plurality of storage shelves 16 and the data storage drive(s) 15. The library may also comprise an operator panel 23 or other user interface, such as a web-based interface, which allows a user to interact with the library. The robot accessor comprises a gripper assembly 20 for gripping one or more data storage cartridges, and a machine reader 22 for reading labels of the present invention, such as a bar code reader. The machine reader may also comprise a smart card reader/writer. The library may comprise one or more frames 12 and 13, in addition to the base frame 11, each having storage shelves 16 accessible by the robot accessor 18. Frames 12 comprise extension frames, having storage shelves and possibly data storage drives, and frame 13 comprises a high availability frame, which may additionally comprise a second accessor robot and additional data storage drives, similar to the base frame 11.

Figure 8:
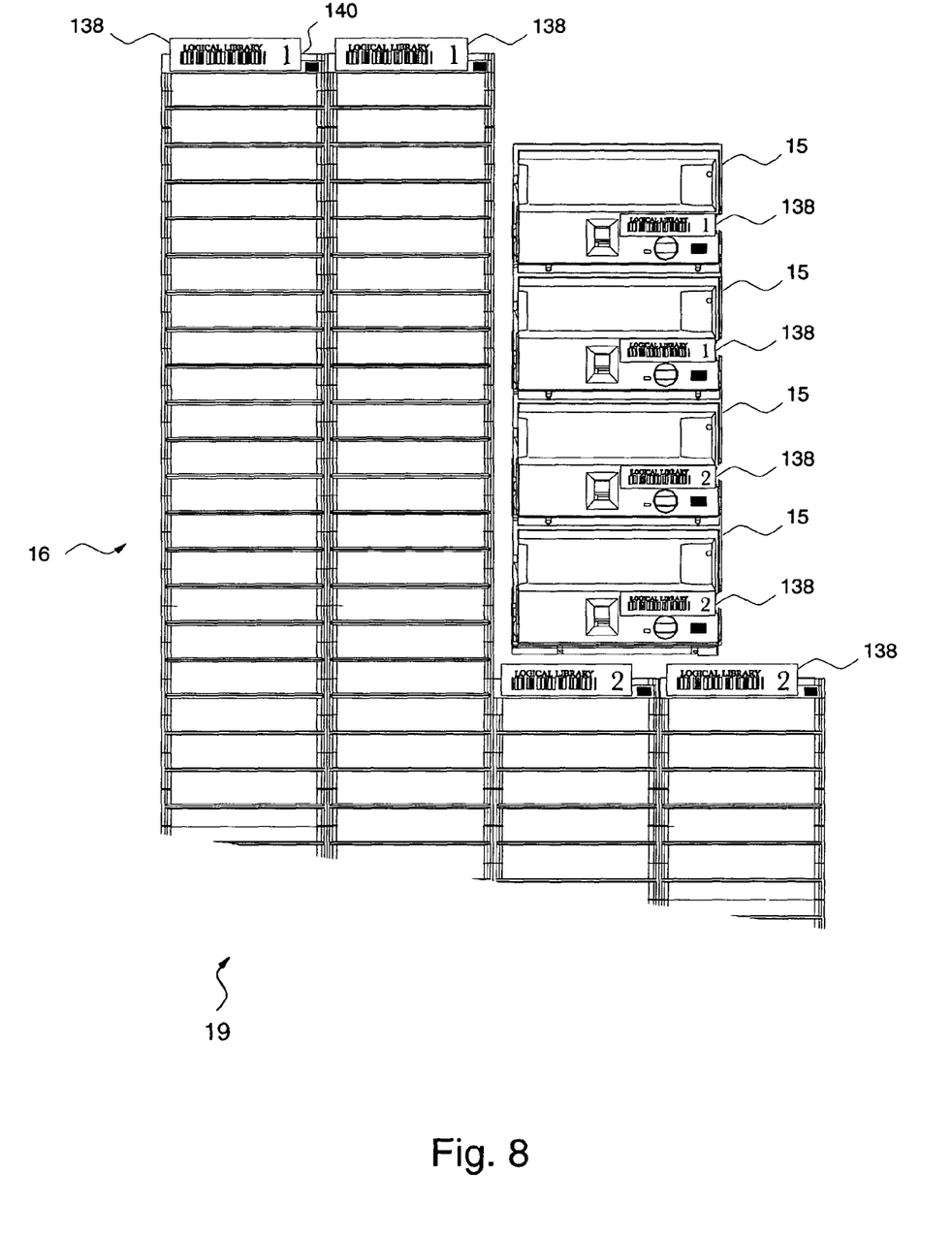
FIG. 8 is a front view of certain components of the automated data storage library of FIGS. 6 and 7.

Referring to FIG. 8, a portion of rear wall 19 of the library is illustrated, comprising components of the library, such as storage shelves 16 and data storage drives 15. The storage shelves 16 are arranged in columns with an electronically updatable external labeling system 138, in accordance with the present invention, positioned at the top of each column. In the illustrated example, the shelf labels associate a particular column of storage shelves with a particular logical library. In addition, electronically updatable external labeling systems 138, in accordance with the present invention, are positioned at the data storage drives 15. In the illustrated example, the drive labels associate a particular drive with a particular logical library.

Electronically updatable external labeling systems can serve both human and machine purposes. For example, the human readable labeling allows an operator to view the physical configuration of the logical libraries, and the machine readable labeling allows the library controller to scan each label position so that the logical configuration can be determined.

The need for large quantities of preprinted labels may be eliminated, and more creative uses may be possible. For example, the human readable portion of a label may be more descriptive to include the name of the server that is attached to the logical library.

Figure 6:
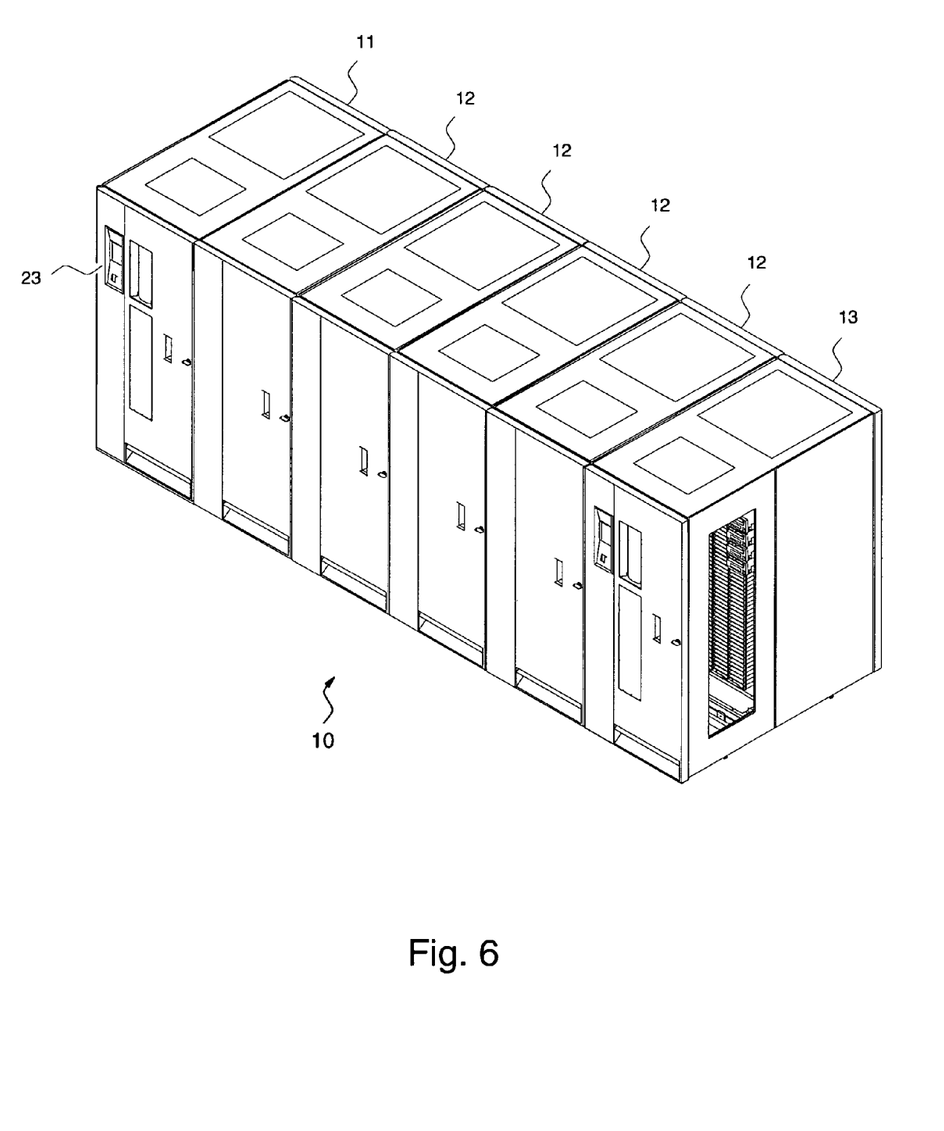
FIG. 6 is an isometric illustration of an automated data storage library which implements embodiments of the present invention.
Figure 7:
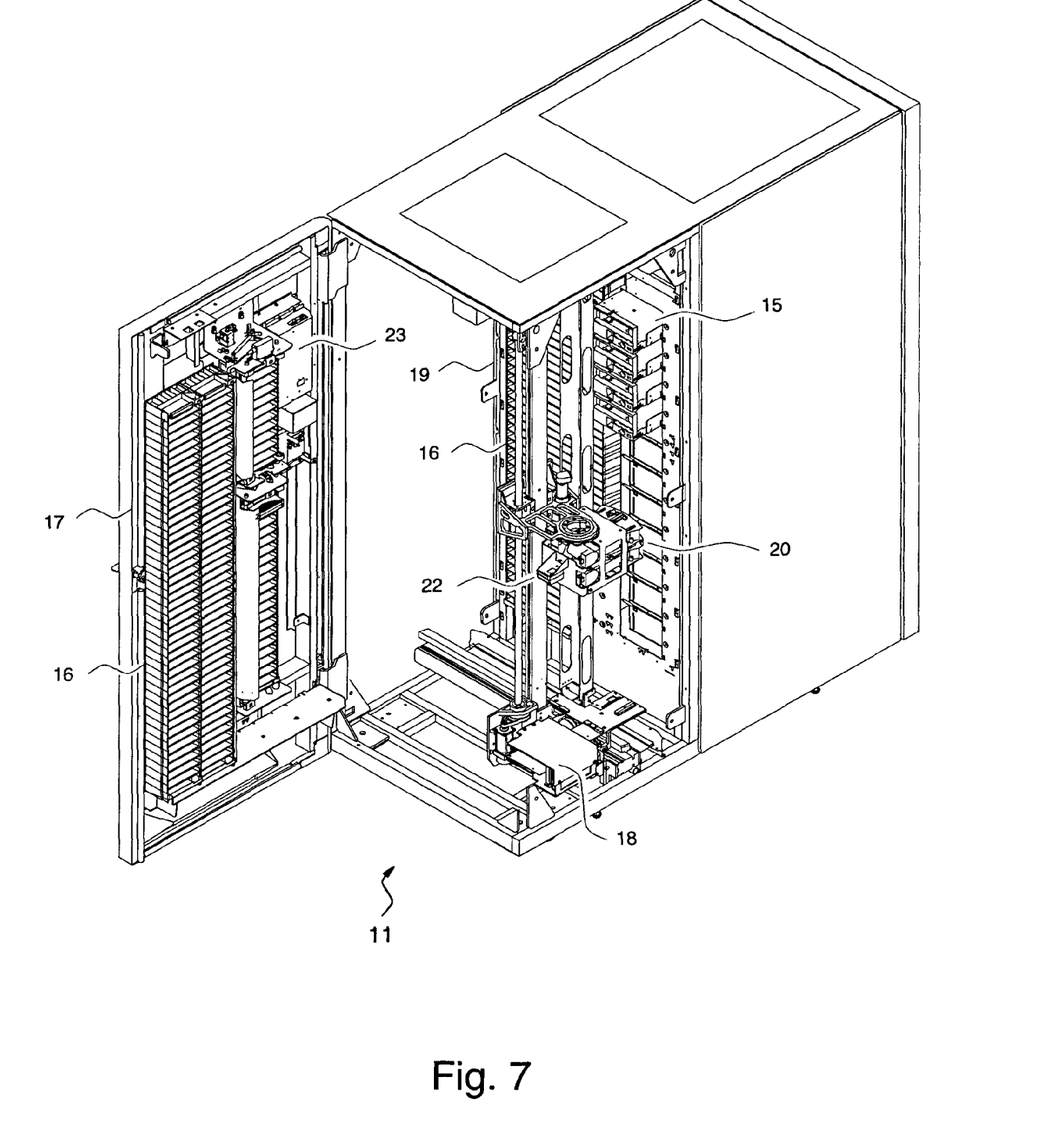
FIG. 7 is an isometric illustration of one portion of the automated data storage library of FIG. 6, shown with a front panel open.
Figure 9:
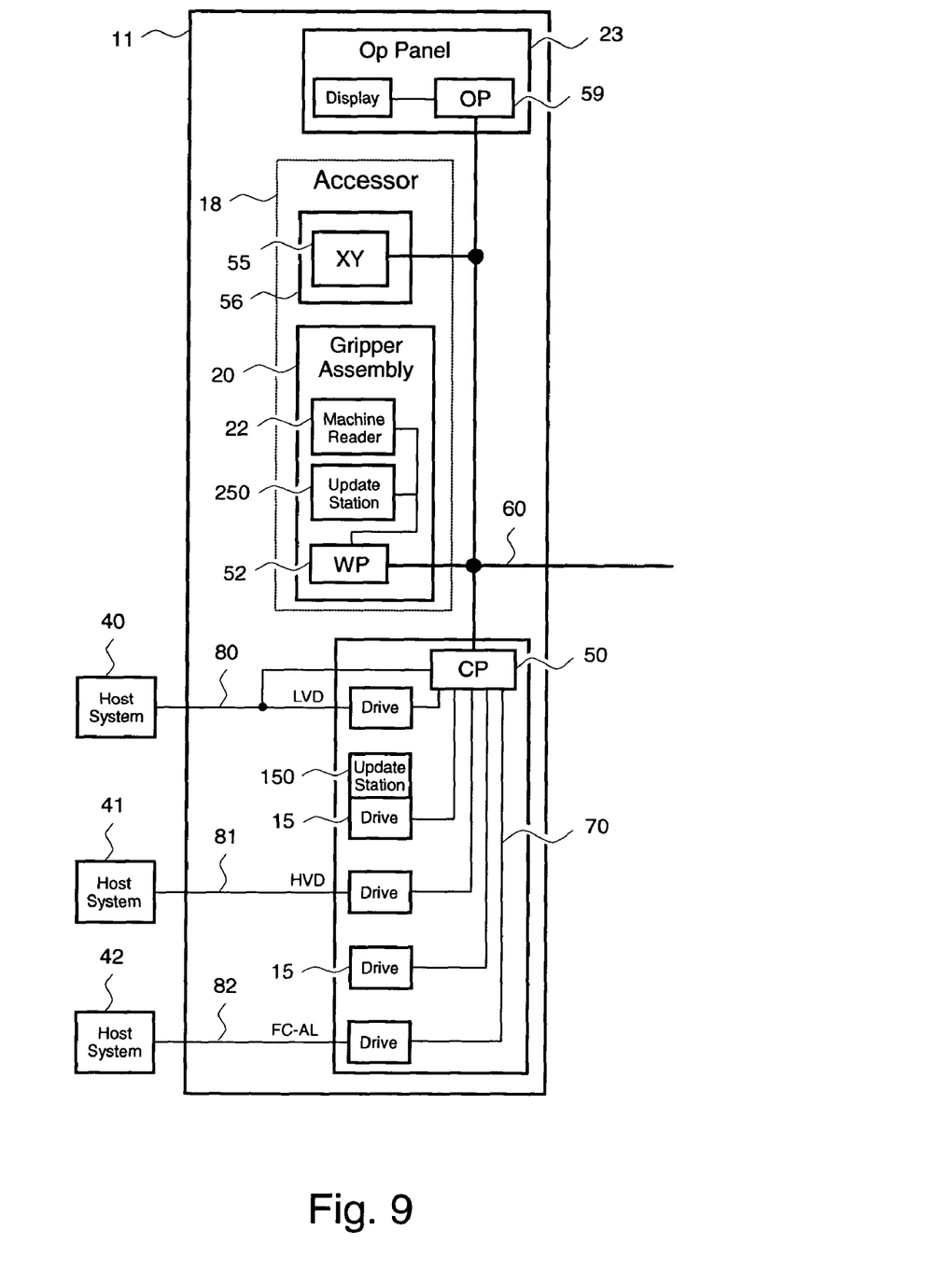
FIG. 9 is a block diagrammatic representation of certain components of the data storage library of FIGS. 6 and 7.

FIG. 9 illustrates certain components of the data storage library of FIGS. 6 and 7, comprising the base frame 11 of the library, which employs a distributed system of modules with a plurality of processor nodes. An example of such a library comprises the IBM 3584 UltraScalable Tape Library. Alternatively, the library may comprise a single or dual processor system centralized in the base frame.

The base frame 11 of FIGS. 6, 7 and 9 comprises one or more data storage drives 15, and a robot accessor 18. The robot accessor 18 comprises a gripper assembly 20 and a machine reader 22 for reading the machine readable displays of the electronic persistent visual displays. Additionally, the machine reader may comprise a smart card reader/writer, etc., for communicating with the nonvolatile electronic memory.

In the exemplary library, the robot accessor 18 moves its gripper in at least two directions, called the horizontal "X" direction and vertical "Y" direction, to retrieve and grip, or to deliver and release the data storage cartridge at the storage shelves 16 and to load and unload the data storage cartridges at the data storage drives 15.

The exemplary library receives commands from one or more host systems 40, 41 or 42. The host systems, such as host servers, communicate with the library directly, e.g. on path 80, through one or more control ports, or through one or more of the data storage drives 15 on paths 81, 82, providing commands to access particular data storage cartridges, and move the cartridges, for example, between the storage shelves and the data storage drives. The commands are typically logical commands identifying the cartridge and/or logical locations for accessing the media.

The exemplary library is controlled by a distributed control system receiving the logical commands from hosts, determining the required actions, and converting the actions to physical movements of the robot accessor 18. The distributed control system comprises a plurality of processor nodes, each having one or more processors. In one example, a communication processor node 50 is located in the frame 11, close to the data storage drives 15. Additionally, one or more work processor nodes 52 are provided, in the example, at the robot accessor 18, and is coupled to the communication processor node 50 over a network 60. The communication processor node provides a communication link for receiving the host commands, either directly or through the drives 15. The work processor node responds to received commands from the communication processor node, and directs the operation of the robot accessor, providing move commands. An XY processor node 55 may be located at an XY system 56 of the robot accessor 18. The XY processor node 55 is coupled to the network 60, and is responsive to the move commands, operating the XY system to position the gripper 20, and the machine reader 22.

Referring to FIGS. 7 and 9, in one embodiment of the present invention, the library is provided with an update station 250, for example, mounted at the robot accessor 18, to interface an accessed data storage cartridge(s) at a storage shelf 16 or at a data storage drive 15 with the update station. The update station 250 of FIGS. 7 and 9 is similar to the update station 150 depicted in FIG. 4. The work processor 52 operates the update station 250 to provide an update signal for updating an electronic persistent visual display 110 of the accessed data storage cartridge 100 of FIGS. 1 and 2, by providing an update signal, interfacing with respect to the input 142 of the module 140 of FIG. 5. Alternatively, or additionally, the update station 150 may be provided at one or more of the data storage drives 15 of FIG. 9, and/or as a separate station, and operated by the communication processor 50.

Referring to FIGS. 4, 5, 7 and 9, the update information is supplied by the update station 150 to the input 142 of the electronically updatable external labeling system. The input 142 provides a signal for updating the visual display of the electronic persistent visual display, and the update agent 144 operates the electronic persistent visual display 110 in accordance with the signal of the input to update the visual display, such that the visual display comprises an updated persistent visual display label. The update station 150 additionally may supply the altering information to the nonvolatile electronic memory 147, optionally via input 142.

Referring to FIGS. 7, 8 and 9, in one embodiment of the present invention, the update station 250 mounted at the robot accessor 18 interfaces with the electronically updatable external labeling systems 138 positioned in the vicinity of a component of the automated data storage library, comprising at least one of a plurality of storage shelves 16, and/or at least one data storage drive 15 and/or at least one robot accessor 18. The robot accessor may comprise a machine visual display reader 22 mounted at the robot accessor 18 for reading the machine readable visual display of the electronic persistent visual display, and an update station 250 is provided at the robot accessor. As above, the update station 250 of FIGS. 7 and 9 is similar to that depicted in FIG. 4. The work processor 52 operates the update station 250 to provide an update signal for updating an electronic persistent visual display 110 of the accessed electronically updatable external labeling systems 138 of FIG. 8, by providing an update signal, interfacing with respect to the input 142 of the module 140 of FIG. 5. The update station 250 may be used to electronically read the value of the electronic persistent visual display 110, eliminating the need for a machine visual display reader 22.

Referring to FIGS. 4 and 5, the update information is supplied by the update station 250 to the input 142 of the electronically updatable external labeling system. The input 142 provides a signal for updating the visual display of the electronic persistent visual display, and the update agent 144 operates the electronic persistent visual display 110 in accordance with the signal of the input to update the visual display, such that the visual display comprises an updated persistent visual display label.

In one embodiment, the electronic persistent visual display of the electronically updatable external labeling systems 138 of FIG. 8 are positioned to be visible to a human, for example, so as to be visible externally of the library, as when a door is open, and the visual display comprises a human readable visual display. In a further embodiment, the electronic persistent visual display is positioned in the vicinity of a component of the automated data storage library, and is visible to an accessing machine reader 22. As discussed above with reference to FIGS. 3A, 3B, 3C and 3D, the electronically updatable external labeling system may provide both human readable visual displays and machine readable displays, such as illustrated in FIG. 3A, the visual display 120 comprising a human readable display 121 and a machine readable display 122. In FIG. 3B, the visual display 125 comprises a machine readable display 127. In FIG. 3C, the visual display 130 comprises a human readable display 131. In FIG. 3D, the visual display 135 comprises a human readable display 136 and a machine readable display 137, and the human readable display has been set to all "blanks", for example, by the security control.

The illustrated components of the electronically updatable external labeling systems 138 and automated data storage library 10 may be varied, combined, or combined functions may be separated, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. An electronically undatable external labeling system for a data storage element, comprising:

an external surface of said data storage element;

an electronic persistent visual display at said external surface, for providing a visual display;

an input for providing a signal for updating said visual display of said electronic persistent visual display;

an update agent for operating said electronic persistent visual display in accordance with said signal of said input to update said visual display, such that said visual display comprises an undated persistent visual display label;

a nonvolatile electronic memory provided at said data storage element, for storing information related to said visual display;

a memory input for providing a signal for altering said information of said nonvolatile electronic memory, updating said information, such that said electronic persistent visual display and said information both are electronically updatable; and a refresh control for sensing said nonvolatile electronic memory, and providing a refresh signal related to said sensed nonvolatile electronic memory, for refreshing said visual display of said electronic persistent visual display; and operating said update agent for updating said visual display of said electronic persistent visual display in accordance with said refresh signal of said refresh control.

2. An electronically updatable external labeling system for a data storage element, comprising:

an external surface of said data storage element;

an electronic persistent visual display at said external surface, for providing a visual display;

an input for providing a signal for updating said visual display of said electronic persistent visual display;

an update agent for operating said electronic persistent visual display in accordance with said signal of said input to update said visual display, such that said visual display comprises an undated persistent visual display label; and a security control selectively providing a security signal; and operating said update agent to convert said visual display of said electronic persistent visual display to a blank in response to said security signal.

3. A data storage cartridge, comprising:

a cartridge shell, capable of supporting at least one data storage media;

an electronic persistent visual display supported at said cartridge shell, for providing a visual display;

an input for providing a signal for updating said visual display of said electronic persistent visual display;

an update agent for operating said electronic persistent visual display in accordance with said signal of said input said visual display, such that said visual display comprises an updated persistent visual display label;

a nonvolatile electronic memory for storing information related to said visual display;

a memory input for providing a signal for altering said information of said nonvolatile electronic memory, updating said information, such that said electronic persistent visual display and said information both are electronically updatable; and a refresh control for sensing said nonvolatile electronic memory, and providing a refresh signal related to said sensed nonvolatile electronic memory, for refreshing said visual display of said electronic persistent visual display; and operating said update agent for updating said visual display of said electronic persistent visual display in accordance with said refresh signal of said refresh control.

4. A data storage cartridge, comprising:

a cartridge shell, capable of supporting at least one data storage media;

an electronic persistent visual display supported at said cartridge shell, for providing a visual display;

an input for providing a signal for updating said visual display of said electronic persistent visual display;

an update agent for operating said electronic persistent visual display in accordance with said signal of said input to update said visual display, such that said visual display comprises an updated persistent visual display label; and a security control selectively providing a security signal; and operating said update agent to convert said visual display of said electronic persistent visual display to a blank in response to said security signal.

5. A magnetic tape data storage cartridge, comprising:

a cartridge;

a magnetic tape data storage media supported by said cartridge;

an electronic persistent visual display supported at said cartridge, for providing a visual display;

an input for providing a signal for updating said visual display of said electronic persistent visual display;

an update agent for operating said electronic persistent visual display in accordance with said signal of said input to update said visual display, such that said visual display comprises an updated persistent visual display label;

a nonvolatile electronic memory for storing information related to said visual display;

a memory input for providing a signal for altering said information of said nonvolatile electronic memory, updating said information, such that said electronic persistent visual display and said information both are electronically updatable; and a refresh control for sensing said nonvolatile electronic memory, and providing a refresh signal related to said sensed nonvolatile electronic memory, for refreshing said visual display of said electronic persistent visual display; and operating said update agent for updating said visual display of said electronic persistent visual display in accordance with said refresh signal of said refresh control.

6. A magnetic tape data storage cartridge, comprising:

a cartridge;

a magnetic tape data storage medial supported by said cartridge;

an electronic persistent visual display supported at said cartridge, for providing a visual display;

an input for providing a signal for updating said visual display of said electronic persistent visual display;

an update agent for operating said electronic persistent visual display in accordance with said signal of said input to update said visual display, such that said visual display comprises an updated persistent visual display label; and a security control selectively providing a security signal; and operating said update agent to convert said visual display of said electronic persistent visual display to a blank in response to said security signal.

* * * * *

UNITED STATES PATENT AND TRADEMARK OFFICE
CERTIFICATE OF CORRECTION

PATENT NO. : 6,970,318 B2
APPLICATION NO. : 10/649095
DATED : November 29, 2005
INVENTOR(S) : Goodman et al.

It is certified that error appears in the above-identified patent and that said Letters Patent is hereby corrected as shown below:

Claim 2, Column 11, line 8    Change "undated" to --updated--

Claim 3, Column 11, line 23    After "input" add --to update--

Claim 6, Column 12, line 35    Change "medial" to --media--

Signed and Sealed this

Twenty-second Day of August, 2006

JON W. DUDAS
*Director of the United States Patent and Trademark Office*